UNITED STATES PATENT OFFICE.

JANE B. EVANS, OF PHILADELPHIA, PENNSYLVANIA.

METHOD OF PREPARING FILLING MATERIAL.

1,292,282.   Specification of Letters Patent.   Patented Jan. 21, 1919.

No Drawing.   Application filed March 30, 1917. Serial No. 158,764.

Be it known that I, JANE B. EVANS, a citizen of the United States, and a resident of Philadelphia, Pennsylvania, have invented Methods of Preparing Filling Material, of which the following is a specification.

One object of my invention is to provide a substance for filling pillows, cushions and the like, which while being inexpensive, easily obtainable, sanitary and durable, shall not pack nor break into smaller pieces but shall maintain its springiness under conditions of use for an indefinite period.

It is further desired to provide a novel method for preparing the material which I desire to employ for filling pillows, etc., which, while removing certain objectionable substances, shall impart to it desirable qualities and in general, materially improve it for the purposes for which it is employed.

I have discovered that the marine growths and particularly that known as eel grass, (*Zostera marina*) when properly prepared, may be employed with advantageous results as a filling or stuffing material for pillows, etc., which will possess certain most desirable qualities. For this purpose I preferably secure eel grass which is grown in the waters of the River and Gulf of St. Lawrence or in the neighboring relatively cold waters and place it in a suitable vessel containing water at a temperature preferaby between 120° to 140° F., though obviously water at higher temperatures may be employed without departing from my invention.

While in this bath the grass is preferably agitated to cause circulation and a washing action of the water and to permit of the dislodgment of solid particles, such as sand, earthy material, etc., as well as to assist in the removal of the greater part of the mineral compounds due to its growth or immersion in sea water. This treatment, while cleaning the grass, renders it soft and diminishes its springiness, so that after the above described washing process, I find it desirable, after rinsing it in cold water, to immerse the grass in a second bath of cold water for a period of from fifteen to twenty minutes, after which it is removed and spread out in comparatively thin layers for the purpose of drying, although if desired, the removal of the water may be hastened by any suitable means as by forcing cold or warm air through it.

This treatment of the grass by cold water restores its "life" and springiness, and I have found that the addition of 30 to 50 ounces of salt or glycerin to each one hundred gallons of this cold bath, materially assists in restoring the toughness that it originally possessed and in a large measure prevents subsequent breakage or shattering of the grass. After drying it is available for use, being in the form of a mass of tough, ribbon-like grass in a more or less twisted and matted but exceedingly springy condition, which even though the mass be repeatedly handled or kneaded, has little if any tendency to break or crumble and is odorless as well as practically antiseptic. If found desirable for certain purposes, the grass may be bleached by any of the processes well known in the art, to remove its coloring material, after which, while still possessing its above noted valuable qualities, it is white or of a light straw color and may be repeatedly washed without causing stains on the fabric bags or containers in which it is used.

I have found that the above described product furnishes a most desirable substance for stuffing pillows and cushions, particularly such as are required for hospital and surgical use and it is likewise available as a thoroughly satisfactory filling for surgical compresses, fracture boxes, etc. In every case its lightness, possibility of repeated washing without injury, and long continued use without breaking and crumbling, as well as its retention of its springiness without packing make it available for many purposes where more expensive and less satisfactory materials have hitherto been used.

While the treatment of the grass by hot water renders the product substantially sterile, it may be made perfectly so without departing from my invention, by any suitable heat or chemical treatment, and in some cases the bleaching process may be relied upon to accomplish this end.

It is to be understood that the method of treatment above described for restoring or imparting the resiliency to eel grass may with advantage be employed to obtain similar results in connection with processes involving the use of other materials such as various marine and land grasses, sea weed, etc.

Although I have found eel grass to serve most satisfactorily as the raw material for use in carrying out my invention, it is to be understood that other marine growths capable of similar use and treatment may be employed without departing from said invention, particularly the various similar grasses found in the shallow sea-water along the greater part of the Atlantic coasts south from the Gulf of St. Lawrence.

In addition to the various uses above enumerated for my product, it may obviously be employed for stuffing furniture and mattresses, as a sanitary substitute for the hair, wool, felt, cotton, moss, etc., now employed, as well as a packing material for various relatively fragile articles in place of excelsior, shavings, paper waste, etc.

I claim:—

1. The method of preparing a filling material which consists in washing vegetable fiber in a bath of hot water and then in a bath of cold water containing a toughening material.

2. The method of preparing a filling material which consists in washing vegetable fiber in a bath of hot water and then in a bath of cold water containing salt.

In witness whereof I affix my signature.

JANE B. EVANS.

Copies of this patent may be obtained for five cents each, by addressing the "Commissioner of Patents, Washington, D. C."